Nov. 12, 1940.　　　O. W. SJOGREN ET AL　　　2,221,461
OFFSET DISK HARROW
Filed Jan. 2, 1940　　　3 Sheets-Sheet 1

INVENTORS
OSCAR W. SJOGREN
GEORGE E. GEROLD
BY
ATTORNEYS.

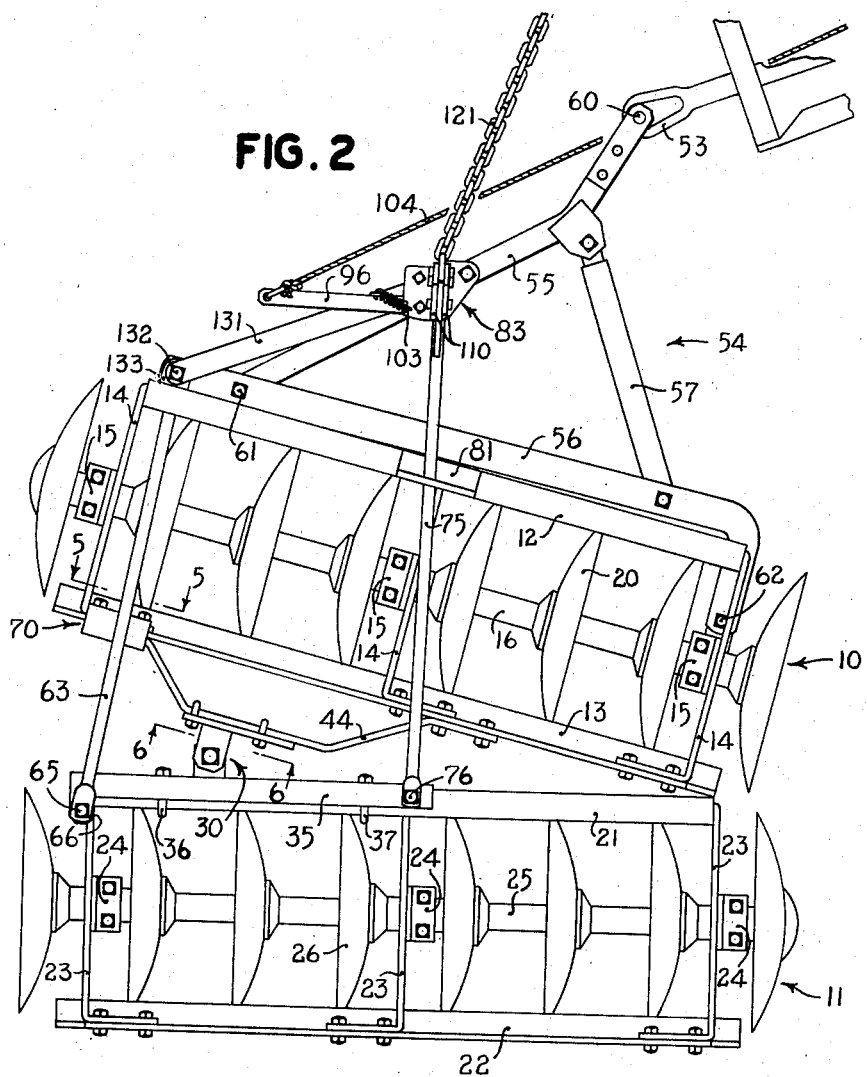

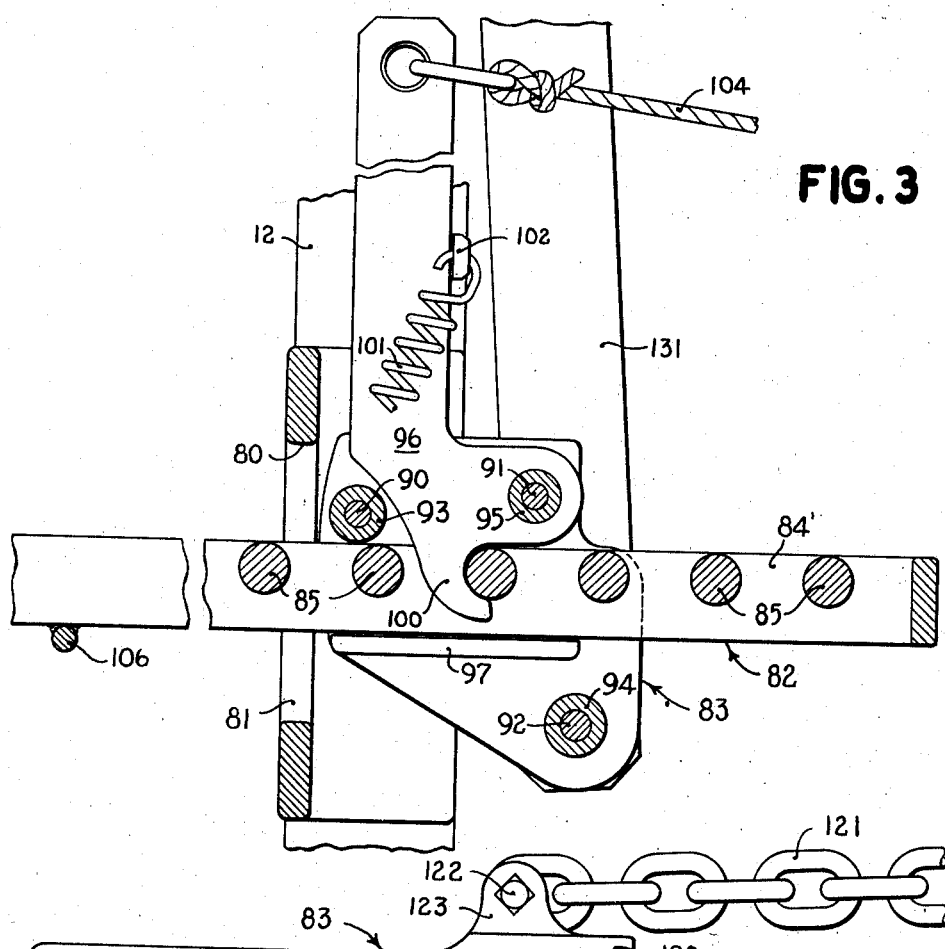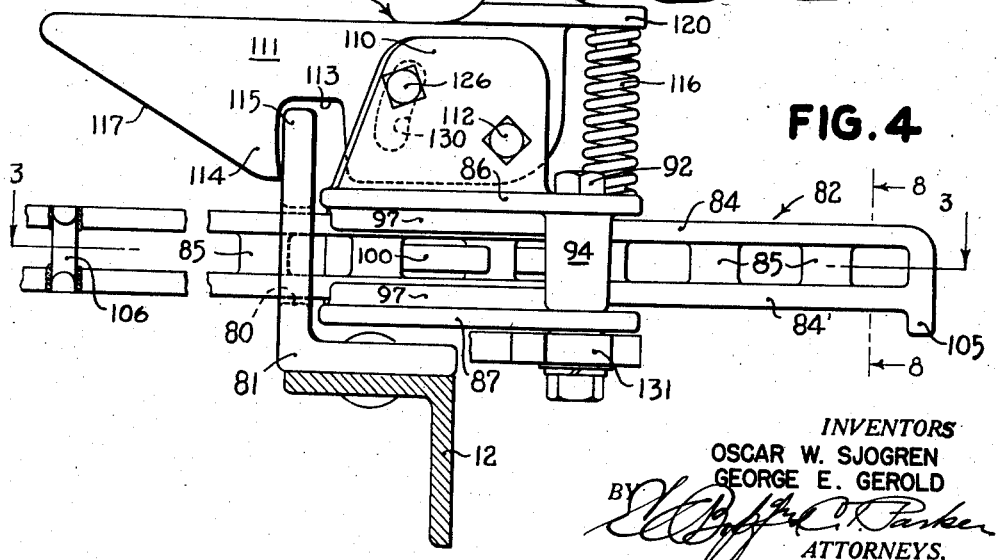

Patented Nov. 12, 1940

2,221,461

UNITED STATES PATENT OFFICE 2,221,461

OFFSET DISK HARROW

Oscar W. Sjogren, Huntington Park, and George E. Gerold, Los Angeles, Calif., assignors to Killefer Manufacturing Corporation, Los Angeles, Calif., a corporation of California Application January 2, 1940, Serial No. 312,028

25 Claims. (Cl. 55—83)

The present invention relates to agricultural implements and is more particularly concerned with tractor drawn disk harrows of the offset or single tandem type having front and rear gangs pivotally connected together for horizontal swinging movement between a working position in which the gangs diverge laterally in one direction, and a turning position in which the gangs diverge in the opposite direction. The principal object of our invention is to provide an improved harrow embodying novel means for holding the gangs in desired working position while the implement is being drawn forwardly, and operative when the tractor is turned in one direction to move the gangs to turning position.

Another object is to provide new and improved means for adjusting the angular relation between the front and rear gangs when the implement is in working position.

These objects are accomplished by providing an angling bar that is pivotally connected with one of the gangs and has an angle selecting slide which is adjustably mounted on the angling bar and which embodies a releasable latch engaging the other of the gangs for locking the two gangs in fixed angular relation. A turn chain is connected with the tractor at a point offset laterally from the draft hitch connection and with the latch in a manner so as to disengage the latter from the gang when the tractor is turned and then exert a force on the angling bar to move the gangs into reverse angle and allowing the harrow to negotiate a turn. When the tractor is straightened out after completing the turn, the turn chain slackens off, allowing the gangs to return to their normal working angle and the latch pawl to reengage the gang.

A further object of the present invention is to provide improved means for holding both the front and rear gangs substantially level so that the disks penetrate to a uniform depth throughout the length of each gang. As is well known in the art, there is a tendency for the front gang to run deeper at one end thereof, and for the rear gang to run deeper at the opposite end due to the general practice of making the front gang disks concave to the right and the rear gang disks concave to the left. The present invention contemplates balancing these forces by interconnecting the gangs in such a manner that the tendency of the front gang to rise at one end is resisted by the tendency of the rear gang to run deeper at the same end.

Another object of the present invention is the provision of means for shifting the rear gang laterally with respect to the front gang without disturbing the relationship existing between the pivot means connecting the gangs and the draft connections which serve to angle the gangs.

Still another object has to do with providing improved means for tilting one of the gangs with respect to the other in order to further compensate for the tendency of the gangs to ride high at one end and dig deeper at the other end.

These and other objects and advantages of the present invention will become apparent to those skilled in the art after consideration of the following detailed description of the preferred embodiment thereof, reference being had to the appended drawings, in which Figure 1 is a plan view of a single tandem harrow constructed according to my invention, showing the gangs in normal operating position;

Figure 2 is a view similar to Figure 1, showing the harrow making a right hand turn;

Figure 3 is an enlarged horizontal section of the latch device, taken substantially along the line 3—3 of Figure 4;

Figure 4 is a side elevation of the latch device shown in Figure 3;

Figure 5 is an enlarged front view of the leveling plate, taken substantially along the line 5—5 of Figure 2;

Figure 6 is an enlarged sectional view, taken along the line 6—6 in Figure 2, showing the adjustable connection between the front and rear gangs;

Figure 1:
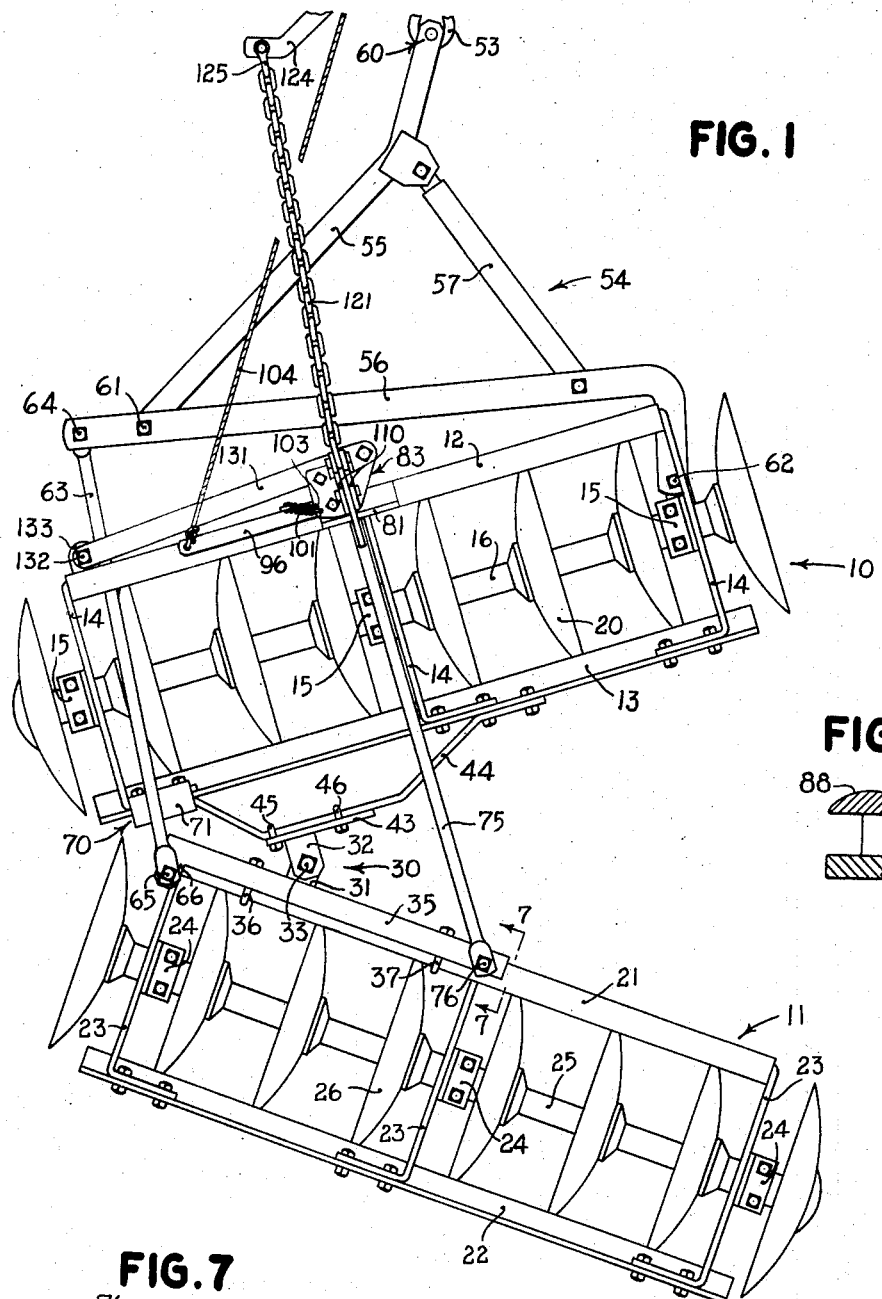

Referring now to the drawings, the harrow chosen to illustrate our invention is of the single tandem type comprising front and rear disk gangs 10 and 11, respectively, connected together for horizontal swinging movement between a working position with the gangs diverging to the right, as in Figure 1, and a turning position with the gangs diverging to the left, as in Figure 2. The front gang consists of a rectangular frame made up of transverse angle irons 12 and 13 which are connected by cross pieces 14, and carried on the frame in any suitable manner are bearings 15 in which a gang shaft, or axle 16 is journaled. Disks 20 of conventional type are mounted on the axle 16 and are here shown as concave to the right, as is common practice. Rear gang 11 is of similar construction and consists of transverse angle irons 21 and 22, connected by cross pieces 23, and carrying bearings 24 in which a gang shaft 25 is journaled. Disks 26 are mounted on the gang shaft 25 with their concave faces to the left, opposite to those of the front gang. For purposes of describing the present invention, only a conventional showing of the disk gangs is made, but in so far as the invention is concerned, the mounting of the axles, disks and bearings may be of any type desired.

Figure 7:
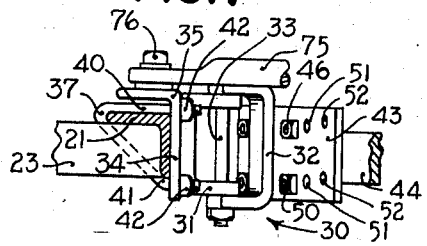
Figure 7 is an enlarged sectional view, taken along the line 7—7 of Figure 1, showing the pivotal connection between the front and rear gangs, and the means by which the rear gang is shiftable laterally with respect to the front gang.

The front and rear gangs 10, 11 are pivotally connected together for horizontal swinging movement by pivot means, indicated generally by the reference numeral 30 and comprising a pair of cooperating U-shaped members 31 and 32 connected together by a vertical pivot bolt 33. Member 31 is fixed, as by welding, to the vertical flange 34 of a generally transverse angle iron beam 35 intermediate of the ends thereof, and beam 35 is adapted to be secured to the leading edge of frame member 21 of the rear gang in laterally adjusted position by means comprising a pair of V-shaped clamping bolts 36 and 37 embracing the frame member 21 and having shanks 40 and 41 extending forwardly through suitable holes in the flange 34 of the beam 35, as best shown in Figure 7. Nuts 42 are threaded on the ends of the shanks 40, 41 and bear against the flange 34, and when tightened, serve to clamp the beam 35 rigidly to the frame member 21. By loosening the nuts 42, the beam 35 can be moved laterally with respect to the rear gang 11 and again secured rigidly to the frame member 21. The purpose of this adjustment is to allow the disks of the rear gang to be moved laterally into position for splitting the ridges thrown up by the disks of the front gang.

The other U-shaped member 32 of the pivot means is welded or otherwise fixed to a mounting plate or bracket member 43, which is adapted to be secured to an extension member 44 fixed to the back side of frame member 13 of the front gang. The bracket member 43 is connected with the extension member 44 by two U-bolts 45 and 46 spaced apart laterally and disposed on opposite sides of the pivot member 32. These U-bolts embrace the extension member 44 with their shanks extending rearwardly through suitable holes provided in the bracket member 43, and nuts 50 are threaded on the ends of the bolts to bear against the bracket member and clamp the same rigidly to the extension member. In the preferred form of our invention we have provided additional pairs of bolt holes 51 and 52 in the bracket member 43 to receive the shank portions of U-bolt 46, each pair of holes being offset vertically from the adjacent pair as shown in Figure 6, so that by removing the bolt 46 from the holes in which it is shown and replacing it in either pair of alternate holes 51, 52, it is possible to secure a certain degree of angular adjustment between the bracket member 43 and frame extension member 44 which has the effect of tilting one of the gangs laterally with respect to the other. This lateral tilting adjustment is advantageous under certain conditions for leveling the gangs and counteracting the tendency of the gangs to incline laterally in opposite directions.

The harrow is attached to the drawbar 53 of a tractor by means of a triangular draft frame 54 comprising a longitudinal draft bar 55, a transverse spreader bar 56, and a diagonal draft bar 57. Bar 55 is swingably connected at its forward end at 60 to the drawbar 53 and is pivotally attached at 61 to the left end of the transverse bar 56. The right end of the bar 56 is bent rearwardly and is pivotally connected at 62 to a suitable bracket member fixed to the front gang frame. A pull rod 63 is connected by a pivot bolt 64 to the extreme left end of the transverse bar 56 and extends rearwardly therefrom, passing under frame member 12 and over member 13 of the front gang and connected by a pivot bolt 65 to a rearward projection 66 formed at the left end of the transverse beam 35.

Carried on the front gang 10 is a gang leveling device for holding the front and rear gangs substantially in the same horizontal plane, said device being preferably in the form of an angle iron supporting member or leveling plate 70 mounted on the frame member 13 directly below the pull rod 63 and disposed to thrust upwardly against the rod, thereby utilizing the tendency of the front gang to rise at its left end for counterbalancing the tendency of the rear gang to dig deeper at its left end. The leveling plate 70 has a horizontal flange 71 and a vertical flange 72, the latter being provided with a pair of laterally spaced vertically disposed slots 73 (Figure 5) through which fastening bolts 74 are passed to secure the leveling plate to the vertical flange of the angle iron frame member 13. Hence, vertical adjustment of the levling plate 70 with respect to the front gang can be had by loosening the bolts 74 and sliding the leveling plate up or down, within the limits of the slots 73, to bring the horizontal flange into contact with the underside of the pull rod 63.

Figure 8:
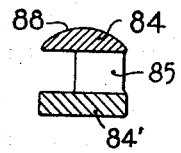
Figure 8 is a sectional view through the latch bar, taken substantially along the line 8—8 in Figure 4.

The gangs 10 and 11 are positively held in angled working position while the implement is being drawn forwardly, and are swung to turning position when the tractor turns to the right, by means which will now be described. An angling member, or pull up rod 75 is pivotally connected to the right end of the transverse beam 35 by a pivot bolt 76 and extends forwardly therefrom above the front gang 10. The front end of the pull up rod 75 is movable in a fore and aft direction with respect to the front gang 10 and extends through a transverse slot 80 in a latch bar guide 81 which is riveted or otherwise fixed to the top of the forward frame member 12. The front end of the pull up rod 75 constitutes a latch bar 82 upon which an angle selecting latch 83 is slidably mounted, the latch bar 82 being preferably formed with a pair of vertically spaced parallel bars 84, 84', suitably joined together and having cross teeth 85 extending therebetween at regularly spaced intervals along the length of the latch bar. The upper bar 84 has its top surface rounded, as at 88 (see Figure 8), so that dust and dirt will readily fall off and will not be carried into the latch 83 where it might clog the mechanism or otherwise interfere with the free operation of the latch.

The latch 83 comprises parallel top and bottom plates 86 and 87 spaced apart vertically to receive the latch bar 82 between them and connected together by three triangularly spaced bolts 90, 91, and 92. Bolts 90 and 92 are passed through lugs 93, 94, respectively, formed integral with the top plate 86, while bolt 91 is passed through the hub portion 95 of an angle selecting lever or detent member 96 disposed between the plates 86, 87, and serves as a pivot for said lever. Lugs 93, 94 and hub 95 space the plates 86, 87 apart a distance slightly greater than the thickness of the latch bar 82 so that the latch 83 will slide freely on the bar without binding, the latch bar being guided through the latch between lug 93 and cooperating lip flanges 97 formed on the top and bottom plates. The angle selecting lever 96 has a hook 100 engageable with the teeth 85 of the latch bar 82 for the purpose of locking the latch 83 to the bar at any selected position along the length of the bar. A tension spring 101 is fastened to a lug 102 on the lever 96 and anchored to a lug 103 on the top plate 86 for holding the lever in engagement with the teeth 85 on the latch bar. A control rope 104 is fastened to the outer end of the lever 96 and extends forwardly therefrom to a point within convenient reach of the operator at his station on the tractor. A pull on the control rope 104 disengages the detent hook 100 from tooth 85 and allows the latch 83 to slide lengthwise of the latch bar 82, such sliding movement of the latch being limited in one direction by a downwardly projecting lug 105 at the front end of the latch bar, and in the other direction by a stop 106 welded across the bars 84 as shown in Figure 4.

Formed integral with the top plate 86 and extending upwardly therefrom in laterally spaced parallel relation are two shoulders 110 between which is disposed a latch pawl 111. The latch pawl 111 is pivoted for vertical swinging movement on a transverse pivot bolt 112 extending through suitable aligned holes in the shoulders 110 and pawl 111, and is provided at its outer or rear end with an inclined cam portion 117 which is adapted to ride over the top 115 of the latch bar guide 81 and raise the pawl as the latter is moved rearwardly. A notch 113 is provided in the pawl 111, forming a hook 114 which engages the top 115 of the latch bar guide 81, thereby locking the latch and latch bar to the front gang 10. The pawl 111 is yieldingly urged down into engagement with the stop 115 by a compression spring 116 which thrusts upwardly against a forwardly projecting shoulder 120 on the pawl.

The latch pawl 111 is released from the stop 115 and the latch bar 82 thereby disengaged from the front gang 10 by means of a turn chain or tension member 121, which is connected by a bolt 122 to a bracket 123 on the pawl and fastened by a clevis 125 to a turn bar 124. The turn bar 124 is rigidly mounted on the propelling tractor and projects leftwardly from the drawbar 53, the clevis 125 being secured thereto at a point spaced laterally from the hitch point 60. Vertical swinging movement of the latch pawl 111 is limited by a stop bolt 126 extending through aligned holes in the shoulders 110 and an arcuate slot 130 in the pawl.

A radius rod 131 is pivotally connected at 132 with a bracket 133 fixed to the left end of the front gang frame member 12, and is pivoted on the fastening bolt 92 below the bottom plate 87, as shown in Figure 4. By virtue of this arrangement, the latch and front end of the pull up rod 75 are made to move along an arcuate path about the pivot bolt 132 as a center, and the rod 75 is prevented from fouling or interfering with the disks of the front gang.

The operation of our invention is as follows:
When the harrow is in normal working position with the disk gangs diverging to the right, as in Figure 1, the latch 83 engages the stop 115 to hold the gangs in fixed angular relation. To increase or decrease the angle between gangs, the operator pulls on the control rope 104, disengaging the detent 100 from the teeth 85 of the latch bar. The tractor is then backed up to decrease the angle between gangs, or driven forwardly to increase the angle, and the latch bar 82 slides forwardly or rearwardly through the latch 83, as the case may be. In angling the gangs, draft is applied by the tractor through the hitch 54 against the right end of the front gang and the left end of the rear gang at the bolts 62, 65, respectively. When the desired angle between gangs has been secured, the control rope 104 is released and the detent 100 again engages the teeth 85 to lock the latch bar to the latch. The gangs of disks are thus held positively in fixed angular relation by the pull up rod and latch so that it is not possible for the gangs to run together under such conditions as when the disk harrow is operating down hill or under other varying soil conditions.

When it is desired to make a turn toward the open ends of the gangs of disks, the operator merely turns the tractor to the right, and this results in a forward pull being exerted by the offset turn bar 124 on the chain 121, causing the latch pawl 111 to swing upwardly out of engagement with the stop 115 and releasing the latch 83 from the front gang. Continued forward pull on the chain 121 by the turning of the tractor causes the latch 83 and pull up rod 75 to move forwardly relative to the front gang, swinging the gangs 10 and 11 together into the position illustrated in Figure 2 so that they may properly negotiate a right hand turn. Upon straightening out the tractor again, the tension on the chain is relaxed and the gangs 10 and 11 will assume their angled relation and the latch pawl 111 will be cammed up over the stop 115 to reengage therewith.

To back the implement up while the gangs are in angled working position, the operator has merely to drive the tractor backward while exerting a pull on the control rope 104 to release the latch bar 82 from the latch 83. The rearward push of the draft frame 54 against the right end of the front gang and against the left end of the rear gang causes the gangs to move together to a parallel position, and the latch bar 82 to slide forwardly through the latch 83. This forward movement of the latch bar is limited by the stop 106 which is positioned on the latch bar to engage the rear ends of the lip flanges 97 when the gangs reach parallel position and to prevent further angling movement of the gangs relative to one another. Continued backing movement of the tractor causes the gangs to be pushed rearwardly in parallel relation. When the implement is driven forwardly again, the control rope 104 is held until the gangs reach the desired angular relation, and then released to lock the latch bar 82 to the latch and thereby lock the gangs together.

It is believed that the foregoing conveys a clear understanding of our invention, and while we have illustrated and described but a single working embodiment thereof, it should be manifest that various changes might be made in details of construction without departing from the spirit and scope of the invention as expressed in the following claims.

We claim:
1. A tractor drawn ground working implement comprising front and rear gangs of ground working tools swingably connected together for movement into and out of angled working position, an angling member pivotally connected with one of said gangs, a latch device slidably mounted on said angling member and adapted to be fixedly secured thereto, said latch device being engageable with the other gang for holding said gangs in working position, and means operative to release said latch when the tractor is turned in one direction and exert a force on said angling member to swing said gangs into position for negotiating the turn with the tractor.

2. For use in a tandem disk harrow of the type comprising front and rear gangs swingably connected together for movement into and out of angled working position and having draft means for connecting the harrow with a propelling tractor, an angle control device consisting of a pull up rod pivotally connected with the rear gang, a latch slidably mounted on said pull up rod and engageable with a stop on said front gang, means for fixedly securing said latch to said pull up rod, and tension means connecting said latch with said tractor in a manner whereby said latch is released from said stop when the tractor is turned and a pull is exerted on said pull up rod to swing said gangs into angled position for negotiating the turn with the tractor.

3. In a tractor drawn disk harrow comprising front and rear gangs swingably connected together for movement into and out of angled working position, a draft frame pivotally connected to the front gang adjacent one end thereof and to the rear gang adjacent the opposite end thereof, an angling member pivotally connected with one of the gangs and movable lengthwise with respect to the other gang, a latch device fixed to said member and movable therewith, said latch engaging a stop on said other gang to hold the gangs in selected angular relation, and means connecting said latch with the tractor for disengaging the latch from said stop when the tractor is turned and exerting a force on said member tending to move said gangs out of working position.

4. A disk harrow comprising front and rear gangs pivotally connected together for movement into and out of angled positions, a draft frame having one side pivotally connected with one end of the front gang, means connecting the other side of said draft frame with the opposite end of the rear gang, a gang angling device comprising a member pivotally connected with the rear gang and movable longitudinally with respect to the front gang, a latch fixed to said member and movable therewith relative to the front gang, said latch engaging a stop on said front gang to hold the gangs in working position, and means operative to release the latch and connected with the angling member to move the same after said latch has been released.

5. In a tractor drawn disk harrow comprising front and rear gangs swingably connected together for movement into and out of angled working position, a draft frame pivotally connected to the front gang adjacent one end thereof and to the rear gang adjacent the opposite end thereof, an angling member pivotally connected with the rear gang and movable longitudinally with respect to the front gang, a latch mounted on said member and movable bodily therewith, said latch engaging a stop on said front gang to hold the gangs in working position, and means connected with the tractor at a point spaced laterally from the draft connection and operative to release said latch and move said angling member longitudinally relative to the front gang, thereby swinging said gangs out of working position.

6. For use in a tandem disk harrow of the type comprising front and rear gangs connected together for swinging movement between a normal working position with the gangs diverging in one direction and a turning position with the gangs diverging in the opposite direction, and draft means connecting the harrow to a hitch point on a tractor, a gang angling device comprising a pull up rod connected with the rear gang and movable in a fore and aft direction with respect to the front gang, a latch mounted on said pull up rod and movable bodily therewith, said latch engaging a stop on said front gang to hold the gangs in working position, a tension member connected with the tractor at a point spaced laterally from said hitch point and operative to release said latch from said stop and pull said rod forwardly relative to the front gang, thereby swinging said gangs from working position to turning position.

7. A tractor drawn harrow comprising front and rear disk gangs pivotally connected together for movement into and out of angled operating position, draft means pivotally connected to the tractor and to the front gang adjacent one end thereof, a longitudinally extending pull rod pivotally connected to said draft means opposite the point of connection with the front gang, said pull rod being pivotally connected at its rear end to the rear gang at a point spaced laterally from the axis of pivotal connection of said gangs, an angle adjusting member pivotally connected with the rear gang at a point spaced laterally from said axis opposite said pull rod connection, a latch pawl pivoted on said angle adjusting member and engageable with a stop on said front gang for holding the gangs in operating position, and a flexible member connecting said latch pawl with the tractor whereby turning the tractor causes said latch pawl to disengage said stop and said angle adjusting member to force the gangs out of angled operating position.

8. A tractor drawn harrow comprising front and rear disk gangs pivotally connected together for movement into and out of angled operating position, draft means for connecting said gangs to a hitch point on the tractor, a gang angling device for facilitating the turning of said harrow in one direction, said device comprising a pull up rod pivotally connected with said rear gang and movable in a fore and aft direction with respect to the front gang, a latch pawl pivotally connected with said pull up rod for vertical swinging about a transverse axis and engageable with a stop on said front gang for holding the gangs in operating position, and a turn chain connected with said pawl and with the tractor at a point spaced laterally from said hitch point, whereby said latch pawl is swung out of engagement with said stop and the gangs pulled out of operating position when the tractor is turned in said one direction.

9. In a tandem disk harrow of the type comprising front and rear gangs connected together for swinging movement into and out of angled working position, and draft means for connecting the harrow to a tractor, the combination of an angling member pivotally connected with one of said gangs and movable longitudinally with respect to the other gang, a latch device slidably mounted on said member, means for securing said latch to said angling member at any of several points spaced along the length thereof, said latch being engageable with a stop on said other gang for holding the gangs in adjusted angular relation, and means responsive to turning movement of the tractor in one direction for releasing said latch from said stop and exerting a force on said angling member causing said gangs to swing out of working position.

10. In a tandem disk harrow of the type comprising front and rear gangs connected together for swinging movement into and out of angled working position, and draft means for connecting the harrow to a hitch point on a tractor, the combination of a pull up rod pivotally connected with the rear gang and movable in a fore and aft direction with respect to the front gang, a locking device mounted on said pull up rod for sliding movement along the length thereof, means for securing said locking device to said angling member at any of several longitudinally spaced points thereon, a latch pawl pivoted on said locking device and engageable with a stop on said front gang for holding the gangs in adjusted angular relation, and a tension member connected with said latch pawl and fixed to the tractor at a point spaced laterally from said hitch point.

11. In a tandem disk harrow of the type comprising front and rear gangs connected together for swinging movement into and out of angled working position, and draft means for connecting the harrow to a hitch point on a tractor, the combination of a pull up rod pivotally connected with the rear gang and movable in a fore and aft direction with respect to the front gang, a locking device mounted on said pull rod movable thereon to a plurality of positions, a detent member pivoted on said locking device and engageable with said pull up rod for securing the locking device thereto, a latch pawl pivoted on said locking device and engageable with a stop on said front gang for holding the gangs in adjusted angular relation, a turn chain connected with said latch pawl and fixed to the tractor at a point spaced laterally from said hitch point, and a control rope fastened to said detent member.

12. A disk harrow comprising a pair of gangs swingably connected together in tandem relation, a draft frame pivotally connected with the front gang and having a longitudinally extending pull rod connected at its rear end to the rear gang, an angling member pivotally connected at one end thereof with one of said gangs and movable longitudinally with respect to the other gang, a radius rod swingably connecting the other end of said member with said other gang and operative to prevent said bar from fouling said other gang, a latch pawl pivotally connected with said angling member and engageable with said other gang for holding the gangs in fixed angular relation, and a flexible member fixed to said latch pawl and operative to release said latch when the tractor is turned, and to exert a force on said member causing said gangs to swing into position for negotiating the turn with the tractor.

13. For use in a tandem disk harrow of the type comprising front and rear gangs swingably connected together for movement into and out of angled working position and having draft means for connecting the harrow with a propelling tractor, an angle control device consisting of a pull up rod pivotally connected with the rear gang, a latch slidably mounted on said pull up rod and engageable with a stop on said front gang for holding the gangs in working position, tension means connecting said latch with said tractor and operative to release the latch and pull said gangs out of angled position when the tractor is turned, and a transversely disposed radius rod pivotally connected at one end thereof with said latch and at the other end with the front gang to prevent said pull up rod from fouling the disks of the front gang.

14. An agricultural implement comprising front and rear gangs of earth working tools disposed in tandem relation, a draft frame pivotally connected with said front gang at one end thereof, a transverse beam pivotally connected intermediate its ends to said front gang, a pull rod connecting one end of said beam with said draft frame, an angling member pivotally connected with the other end of said beam and movable to a plurality of positions relative to said front gang, means for locking said member to the front gang, and means for securing said rear gang to said transverse beam in laterally adjusted position.

15. A tractor drawn harrow comprising front and rear disk gangs, a transverse beam fixed to said rear gang and shiftable laterally relative thereto, pivot means intermediate the ends of said beam for connecting the same with said front gang, a draft frame pivotally connected to one end of said front gang and having hitch connection with said tractor, a pull rod connected with said beam near the opposite end of said rear gang and pivotally connected with said draft frame, an angling member pivotally connected with said beam on the opposite side of said pivot means, and means for locking said angling member to said front gang for holding the gangs in angled relation.

16. A tractor propelled disk harrow comprising front and rear gangs arranged in tandem relation, a transverse beam disposed between said gangs and pivotally connected intermediate its ends to the front gang for horizontal swinging, means for securing said rear gang to said beam in laterally adjusted position, a draft frame pivotally connected with one end of said front gang and having hitch connection with the tractor, a pull rod pivotally connected with said beam near the opposite end of said rear gang and with said draft frame, an angling member pivotally connected with said beam at a point spaced laterally from the connection with the pull rod, a latch pawl pivoted on said angling member and engageable with a stop on said front gang for holding the gangs in fixed angular relation, and means connecting said latch pawl with the tractor at a point spaced laterally from said hitch connection whereby turning of the tractor in one direction causes said latch pawl to disengage from said stop and said angling member to force the gangs into an angled position to accommodate said turning of the tractor.

17. For use with a single tandem disk harrow comprising front and rear gangs of oppositely directed disks, means connecting said gangs together for horizontal swinging movement, and a draft frame pivotally connected with the front gang, an angling member pivotally connected with said draft frame and extending rearwardly therefrom adjacent one end of said front gang, said angling member being movable longitudinally with respect to said front gang and having pivotal connection with said rear gang, and means on said front gang disposed to thrust vertically against said angling member whereby the tendency of said front gang to tilt laterally in one direction is counter-balanced by the tendency of the rear gang to tilt laterally in the opposite direction.

18. In combination with a harrow of the type comprising front and rear gangs of oppositely directed disks, means connecting said gangs together for horizontal swinging movement, a draft frame pivotally connected with the front gang, and an angling member pivotally connected with said draft frame and extending rearwardly therefrom adjacent one end of said front gang, said angling member being movable longitudinally with respect to said front gang and having pivotal connection with said rear gang, a gang leveling device comprising a supporting member carried by said front gang and adapted to exert a vertical thrust against said angling member when the front gang tends to tilt laterally in one direction thereby preventing said rear gang from tilting laterally in the other direction, and means for securing said supporting member to said front gang in vertically adjusted position.

19. A harrow of the character described, comprising front and rear gangs of oppositely directed disks, pivot means connecting said gangs together for horizontal swinging movement, a draft member pivotally connected with said front gang at one end thereof, a pull rod connecting said draft frame with the opposite end of said rear gang, a leveling plate mounted on said front gang and engageable with said pull rod to exert an upward thrust thereagainst for resisting the tendency of the pull rod end of the rear gang to dig deeper than the corresponding end of the front gang.

20. A tandem disk harrow comprising front and rear gangs, connecting means fixed to one of said gangs and including a bracket member, and a pair of laterally spaced clamping bolts engageable with said bracket member for rigidly securing said connecting means to the other gang, said bracket member having a plurality of vertically offset holes adapted to receive one of said bolts whereby said gangs can be tilted laterally with respect to one another.

21. A harrow comprising front and rear gangs of disks, pivot means fixed to the front portion of said rear gang and having a bracket member adapted for connection with said front gang, said bracket member being provided with a plurality of laterally spaced holes, certain of said holes being offset vertically with respect to the others, and a pair of laterally spaced U-bolts adapted to embrace the rear portion of said front gang and having shank portions adapted to be received in said holes, one of said U-bolts being selectively positioned in said vertically offset holes whereby said gangs are connected together in laterally tilted relation.

22. A disk harrow comprising front and rear gangs swingably connected together for movement between oppositely angled working and turning positions, draft means for connecting said gangs to a propelling tractor, an angling member pivotally connected at one end thereof with one of said gangs and movable longitudinally with respect to the other gang, a latch pawl pivotally connected with said angling member for swinging movement into and out of engagement with said other gang, said latch pawl being operative to hold the gangs in fixed angular relation, and a flexible member fixed to said latch pawl and connected with the tractor for swinging said pawl out of engagement with said other gang when the tractor is turned and exerting a force on said angling member to swing said gangs from working to turning position.

23. In combination, a latch device having an aperture formed therein, and a latch bar adapted to be received within said aperture for relative sliding movement, said latch bar having the top surface thereof sloping downwardly and outwardly to shed foreign material and prevent the same from being carried into the mechanism of said latch device.

24. In combination, a latch device having an aperture formed therein, and a latch bar having the top surface thereof rounded to shed foreign material, said latch bar being slidably received within the aperture in said latch device.

25. A disk harrow comprising a pair of gangs swingably connected together in tandem relation, a draft frame pivotally connected with the front gang and having a longitudinally extending pull rod connected at its rear end to the rear gang, an angling member pivotally connected at one end thereof with one of said gangs and movable longitudinally with respect to the other gang, a latch pawl pivotally connected with said angling member and engageable with said other gang for holding the gangs in fixed angular relation, and a flexible member fixed to said latch pawl and operative to release said latch when the tractor is turned, and to exert a force on said member causing said gangs to swing into position for negotiating the turn with the tractor.

OSCAR W. SJOGREN.
GEORGE E. GEROLD.